United States Patent [19]

Golden et al.

[11] Patent Number: 5,482,915
[45] Date of Patent: Jan. 9, 1996

[54] TRANSITION METAL SALT IMPREGNATED CARBON

[75] Inventors: Timothy C. Golden, Allentown; Andrew W. Wang, Slatington, both of Pa.; James F. Sciple, Paducah, Ky.

[73] Assignee: Air Products and Chemicals, Inc., Allentown, Pa.

[21] Appl. No.: 123,952

[22] Filed: Sep. 20, 1993

[51] Int. Cl.$^6$ ................................................. B01J 20/20
[52] U.S. Cl. .......................... 502/417; 502/430; 502/432; 502/433
[58] Field of Search ..................... 502/417, 406, 502/423, 424, 427, 437

[56] References Cited

U.S. PATENT DOCUMENTS

| | | | |
|---|---|---|---|
| 1,535,798 | 4/1925 | Wickenden | 502/417 |
| 1,551,074 | 8/1925 | Thienmann | 502/426 |
| 1,559,054 | 10/1925 | Smith | 502/423 |
| 1,845,815 | 2/1932 | Riddle | 502/427 |
| 2,025,367 | 12/1935 | Weerts | 252/3 |
| 3,355,317 | 11/1967 | Keith, II et al. | 117/100 |
| 3,886,093 | 5/1975 | Dimitri | 252/447 |
| 4,082,694 | 4/1978 | Wennerberg et al. | 252/444 |
| 4,234,460 | 11/1980 | Nishimura et al. | 502/417 |
| 5,063,196 | 11/1991 | Doughty et al. | 502/417 |
| 5,071,450 | 12/1991 | Cabrera et al. | 502/437 |
| 5,071,820 | 12/1991 | Quinn et al. | 502/434 |
| 5,081,097 | 1/1992 | Shama et al. | 502/437 |
| 5,098,880 | 3/1992 | Gaffney et al. | 502/417 |
| 5,292,707 | 3/1994 | Aparico et al. | 502/418 |
| 5,319,114 | 6/1994 | Gaffney et al. | 549/529 |

OTHER PUBLICATIONS

Selim, et al; "Catalytic and Surface Properties of Activated Carbon Impregnated with $Cu^{2+}$, $Ni^{2+}$ and $Cr^{3+}$"; *Afinidad*; XLVII; 430; Nov./Dec. 90.

Figueriredo, et al; "Gasification of Active Carbons of Different Texture Impregnated with Nickel, Cobalt and Iron"; *Carbon*; vol. 25, #5; 1987; pp. 703–708.

*Primary Examiner*—Anthony McFarlane
*Attorney, Agent, or Firm*—Geoffrey L. Chase; William F. Marsh

[57] ABSTRACT

The present invention is a synthesis, product and process for activated carbon and preferably carbon molecular sieve separation of air to produce a nitrogen product wherein a carbon is partially pyrolyzed, impregnated with a transition metal salt and further pyrolyzed to develop enhanced microporosity. The resulting microporous carbon can then be activated with carbon dioxide or steam and then pore-sized by cracking of hydrocarbons on the carbon to produce a carbon molecular sieve.

12 Claims, No Drawings

TRANSITION METAL SALT IMPREGNATED CARBON

TECHNICAL FIELD

The present invention is directed to the field of carbon adsorbents. More particularly, the present invention is directed to the impregnation of carbon molecular sieve precursors with transition metal salts to increase microporosity and therefore capacity of the sieves for oxygen in the separation of air to produce a nitrogen product.

BACKGROUND OF THE INVENTION

The production of nitrogen by pressure swing adsorption is traditionally accomplished using a form of activated carbon known as a carbon molecular sieve adsorbent. Because a carbon molecular sieve can differentiate between the molecular sizes of nitrogen and oxygen, thereby adsorbing oxygen more readily than nitrogen, the pressure swing adsorption process can provide a high purity nitrogen product.

The key properties of a carbon molecular sieve adsorbent are adsorption capacity, gas uptake rate and kinetic selectivity. In general, there is a compromise between the kinetic selectivity of a carbon molecular sieve adsorbent and the gas uptake rate, where raising the selectivity invariably results in slower uptake rates. If a carbon molecular sieve adsorbent is made highly selective, the gas uptake rates become very slow, resulting in limitation in productivity of the pressure swing adsorption process. Because of this, the selectivity of a carbon molecular sieve adsorbent can only be enhanced to some less than optimal value.

On the other hand, increasing the capacity of the carbon molecular sieve adsorbent can improve the performance of the pressure swing adsorption process without any detrimental side effects. By creating a carbon molecular sieve with improved capacity without sacrificing its ability to separate nitrogen from oxygen, a pressure swing adsorption process could be utilized with smaller carbon molecular sieve beds, significantly driving down the price of a nitrogen pressure swing adsorption process by reducing the required size. Prior to the advent of carbon molecular sieves, activated carbons were used for various adsorptive processes. The creation of activated carbons begins with the carbonaceous precursor, such as coconut shells, wood, fruit pits, nut shells, coal, peat or bone. The use of metals and metal compounds to enhance various capabilities of activated carbon have also been attempted.

U.S. Pat. No. 1,551,074 discloses a process for impregnating ground peat with iron chloride which is thereafter dried and calcined to produce an activated carbon purportedly with good adsorptive capacity and great rigidity.

U.S. Pat. No. 1,559,054 discloses a process for improving the decolorizing, deodorizing and adsorptive properties of activated carbon by including nickel, palladium, platinum, copper, zinc, osmium, thorium or aluminum in the metallic form in crude organic material prior to burning to form an activated carbon.

U.S. Pat. No. 1,845,815, discloses the treatment of carbon, such as coal, with sodium carbonate before being heated slowly in the presence of air to approximately 240° C. with subsequent removal of the sodium carbonate by washing with water or dilute acid.

U.S. Pat. No. 2,025,367 discloses a process for treating carbon such as peat, in a carbonizing process followed by application of zinc chloride and heating to 350° C. The resulting material is then rinsed with water and dilute acid to remove the chlorides.

U.S. Pat. No. 3,355,317 discloses an adsorbent of carbon for cigarette filters with the impregnation of metals complexed with ammonia such as cobalt, copper, zinc, iron, molybdenum and silver, followed by heating to produce a metal oxide in the carbon filter material. Metal chlorides are not desirable as metal impregnants. Temperatures up to 500° C. are used to heat treat the composite, potentially in an inert atmosphere.

U.S. Pat. No. 3,886,093 describes a process for making activated carbons using lignin impregnated with various transition metal salts, which are then carbonized to produce the activated carbon with active metal sites. The carbonization can be performed at a temperature in the range of 700° to 1800° F.

U.S. Pat. No. 4,082,694 discloses a process for making activated carbons by contact with potassium hydroxide and pre-calcining in a temperature in the range of 600° to 900° F. followed by dehydration and calcining at a temperature in the range of 1300° to 1800° F. to provide an activated carbon useful as an adsorbent for vapors and other adsorptive properties.

U.S. Pat. No. 5,063,196 discloses an activated carbon made by the impregnation with copper, zinc and silver in several steps and heated at a temperature up to 180° C. The resulting product has utility as an adsorbent in gas masks.

U.S. Pat. No. 5,071,820 discloses a process for making a microporous carbon in a two-stage heat treatment process. Coal or a polymer is first heated up to 200° C. in air and then is pyrolyzed in nitrogen at a temperature up to 850° C. Metal impregnants are not identified.

British Patent 1,375,900 discloses a method for making a carbon molecular sieve wherein metal compounds are either impregnated in a carbon precursor or a subsequent formation of carbon molecular sieve to produce adsorbents for various utilities based upon the particular metal impregnated. Platinum, iron and copper are exemplified within the patent.

British patent 2,187,725 discloses the preparation of an adsorbent for a gas mask which uses various metal impregnants on carbons or activated carbons including cobalt, chromium, nickel, zinc and Group VIII transition metal salts. No significant heating is performed after the impregnation of the metal salts on the carbon substrate or support.

The article "Catalytic and Surface Property of Activated Carbon Impregnated with $Cu^{2+}$, $Ni^{2+}$ and $Cr^{3+}$" by M. M. Selim, et al., appearing in Afinidad, November/December 1990, pages 408 through 410, discloses impregnated and activated carbon with copper, nickel or chromium salts and post impregnation activation at a temperature up to 500° C. in an inert helium atmosphere. The materials are used for catalysts rather than adsorbents.

In an article "Gasification of Active Carbons of Different Texture Impregnated with Nickel, Cobalt and Iron" by J. L. Figueiredo, et al., appearing in *Carbon*, Volume 25 No. 5, page 703 through 708 (1987), activated carbons were impregnated with nickel, cobalt and iron prior to gasification wherein the metals constitute catalysts for improved gasification of the activated carbons.

The prior art has impregnated various metals on various carbon and activated carbon precursors, typically to provide catalytic effect and chemi-sorption properties to the resulting carbons and activated carbons. However, these uses of metals, which are basically supported on the carbon substrate, are for their direct catalytic or chemi-sorption properties and were not implemented into the carbons for their effect on the pore geometry of the carbons themselves. Therefore, the prior art has not provided a solution to the problem of attaining high performance carbon adsorbents, which have increased capacity through enhanced microporosity. This problem is overcome by the present invention as will be set forth below wherein a high capacity, fast carbon adsorbent, and preferably a carbon molecular sieve, having enhanced adsorbent properties is prepared by unique process with metal salt impregnations during the formation of microporosity in the synthesis of carbon molecular sieves.

BRIEF SUMMARY OF THE INVENTION

The present invention is a process for preparing an activated carbon impregnated with a transition metal salt, comprising; impregnating a transition metal salt on a pre-char carbon to impart up to an approximately 15 weight percent increase in said carbon; and pyrolyzing said carbon at a temperature in the range of at least approximately 800° C. to produce a transition metal salt impregnated activated carbon.

Preferably, the transition metal is selected from the group consisting of iron, nickel, manganese and copper.

Preferably, the impregnation is performed with a solution of the transition metal salt in an amount no greater than sufficient to wet the carbon.

Preferably, the transition metal salt is impregnated onto the carbon to impart between approximately 0.5 to 15 weight percent increase in the carbon.

Preferably, the transition metal salt is selected from the group consisting of iron chloride, nickel chloride, copper chloride, manganese chloride and iron nitrate.

Preferably, the pyrolysis is performed in an oxidative atmosphere selected from the group consisting of carbon dioxide, air, steam and mixtures thereof.

Alternatively, the pyrolysis is performed in an oxygen deficient atmosphere.

Preferably, the oxygen deficient atmosphere has no more than 0.5 percent oxygen.

Preferably, the pre-char carbon is formed by the pyrolysis of a carbon in an oxygen deficient atmosphere at a temperature in the range of approximately 300° to 600° C.;

Preferably, the carbon is selected from the group consisting of wood, coal, fruit pits, nut shells, bone and coconut shell.

Alternatively, after the pyrolysis the carbon is activated by heating in the presence of an oxidation agent selected from the group consisting of carbon dioxide, air, steam and mixtures thereof.

Preferably, the carbon is further subjected to cracking of hydrocarbons on pores of the activated carbon to restrict the size of the pores in the carbon to produce a transition metal salt impregnated carbon molecular sieve adsorbent having enhanced microporosity.

More preferably, the present invention is a process for preparing a transition metal salt impregnated carbon molecular sieve adsorbent having enhanced microporosity, comprising; pyrolyzing a carbon in an inert atmosphere at a temperature in the range of approximately 300° to 600° C. to partially pyrolyze the carbon to a pre-char carbon; impregnating a solution of a transition metal salt on the partially pyrolyzed pre-char carbon so as to just wet the pre-char carbon to impart an approximately 0.5 to 15 weight percent increase in the pre-char carbon; drying the impregnated pre-char carbon at a temperature no greater than 200° C.; further pyrolyzing the impregnated pre-char carbon in an inert atmosphere at a temperature in the range of approximately 800° to 1000° C. to produce a char; activating the char by heating the char in the presence of an oxidation agent selected from the group consisting of carbon dioxide, air, steam and mixtures thereof; and cracking hydrocarbons on pores of the activated char to restrict the size of the pores in the char to produce a transition metal salt impregnated carbon molecular sieve adsorbent having enhanced microporosity.

The present invention is also a process of adsorbing oxygen from a gas containing oxygen, comprising; contacting said gas in an adsorption zone with an adsorbent selective for oxygen and adsorbing oxygen on the adsorbent, wherein the adsorbent zone comprises a carbon molecular sieve adsorbent impregnated with a transition metal salt synthesized by the process, comprising; impregnating a transition metal salt on a pre-char carbon to impart up to an approximately 15 weight percent increase in the carbon; pyrolyzing the carbon at a temperature of at least approximately 800° C. to produce a transition metal salt impregnated activated carbon; and cracking hydrocarbons on pores of the activated carbon to restrict the size of said pores in the carbon to produce a transition metal salt impregnated carbon molecular sieve adsorbent having enhanced microporosity.

Preferably the gas is air.

The present invention is also an activated carbon impregnated with a transition metal salt synthesized by the process, comprising; impregnating a transition metal salt on a pre-char carbon to impart up to an approximately 15 weight percent increase in the carbon; and pyrolyzing the carbon at a temperature of at least approximately 800° C. to produce a transition metal salt impregnated activated carbon.

Preferably, the carbon is further subjected to cracking of hydrocarbons on pores of the activated carbon to restrict the size of the pores in the carbon to produce a transition metal salt impregnated carbon molecular sieve adsorbent having enhanced microporosity.

More preferably, the present invention is a carbon molecular sieve adsorbent impregnated with a transition metal salt synthesized by the process, comprising; pyrolyzing a carbon in an inert atmosphere at a temperature in the range of approximately 300° to 600° C. to partially pyrolyze the carbon to a pre-char carbon; impregnating a solution of a transition metal salt on the partially pyrolyzed pre-char carbon so as to just wet the pre-char carbon to impart an approximately 0.5 to 15 weight percent increase in the pre-char carbon; drying the impregnated pre-char carbon at a temperature no greater than 200° C.; further pyrolyzing the impregnated pre-char carbon in an inert atmosphere at a temperature in the range of approximately 800° to 1000° C. to produce a char; activating the char by heating the char in the presence of an oxidation agent selected from the group consisting of carbon dioxide, air, steam and mixtures thereof; and cracking hydrocarbons on pores of the activated char to restrict the size of the pores in the char to produce a transition metal salt impregnated carbon molecular sieve adsorbent having enhanced microporosity.

The present invention is also a carbon molecular sieve adsorbent impregnated with a transition metal salt in an amount in the range of 0.5 to 15 weight percent of the adsorbent to impart enhanced microporosity to said adsorbent.

DETAILED DESCRIPTION OF THE INVENTION

The present invention is directed to the synthesis, a product and the use of an enhanced microporous activated carbon adsorbent. Preferably the carbon adsorbent is a carbon molecular sieve. Carbon molecular sieves differ from carbons and activated carbons by having engineered microporosity typically in a discreet and controlled pore size range. In the case of air separation, carbon molecular sieves are typically required to molecularly kinetically distinguish oxygen molecules from nitrogen molecules in air. In air separation, carbon molecular sieves typically kinetically adsorb oxygen more readily than nitrogen, thus resulting in an unabsorbed nitrogen product at approximately feed pressure, while potentially producing an oxygen byproduct during desorption and regeneration at potentially lower pressure than feed pressure. Various techniques can be used to increase porosity of adsorbents and particularly carbon molecular sieves. Heating of carbons has the effect of increasing porosity of the carbon structure, and particularly, the pyrolysis of carbons in inert atmospheres can produce increased porosity. The present invention partially pyrolyzes a carbon precursor to produce a pre-char carbon comprising a carbon having a significant extent of microporosity and thereafter impregnates the microporous pre-char carbon with various transition metal salts to a low overall increased weight, followed by further complete pyrolysis in inert atmosphere, which results in a surprising increase in microporosity as a result of the impregnated metals, wherein the capacity of the ultimate carbon molecular sieve is greatly increased, while the gas uptake rate is also unexpectedly increased despite the extent of pyrolysis. Therefore, the present invention provides a unique and unexpected enhancement in the adsorptive properties of a highly microporous activated carbon, and preferably a carbon molecular sieve, in contrast to known carbon adsorbents.

The transition metal salts can be chosen from any of the compounds of the transition metals of the periodic table of the elements, but iron, nickel, manganese and copper are particularly preferred. Various chlorides and nitrates of these materials may comprise the transition metal salts.

Microporosity is typically defined and recognized in the art as being pores of a diameter of 20 angstroms or less. This contrasts with mesoporosity, which is defined as recognized in the art as pores having a diameter greater than 20 angstroms and less than 500 angstroms. Pore sizes larger than 500 angstroms are typically referred to by those in the art as having macroporosity.

The present invention achieves an enhancement of the microporosity of activated carbon and, more preferably, carbon molecular sieve structures. To obtain the desired result, the transition metal salt impregnation should occur after initial pyrolysis to open carbon basal planes and before final pyrolysis achieves the maximum basal plane relocation or ultimate microporosity.

After the pyrolysis and intercalation of transition metal salts into a subject carbon, the full functional capability of the adsorbent as a carbon molecular sieve is produced preferably by activation with carbon dioxide, steam or air and cracking of hydrocarbons on the pore structure to neckdown the microporous structure of the carbon for kinetic selectivity between oxygen and nitrogen molecules. This results in high performance carbon molecular sieves which are useful in separation of nitrogen from air using pressure swing adsorption air separation techniques.

The key properties of a carbon molecular sieve (CMS) adsorbent are adsorption capacity (the amount of gas that may be adsorbed), gas uptake rate (the rate at which gas adsorbs onto the adsorbent), and kinetic selectivity (the ability of the sieve to differentiate between nitrogen and oxygen). In general, there is a compromise between the kinetic selectivity of a CMS and the gas uptake rate, where raising the selectivity invariably results in slower uptake rates. If a CMS is made highly selective, the gas uptake rate becomes very slow, resulting in a limitation in the productivity of the PSA process. Because of this, the selectivity of a CMS can only be enhanced to some value less than optimal.

On the other hand, increasing the capacity of a CMS can improve the performance of the PSA process without any detrimental side-effects. Calculations indicate that a 10% increase in the capacity of a CMS can result in a 13% improvement in productivity (at 99.5% nitrogen purity) and a 25% capacity boost can improve the PSA productivity (the amount of product obtainable per cubic foot of CMS) by 33%. By creating a CMS with improved capacity without sacrificing its ability to separate nitrogen from oxygen, an air separation facility can be constructed with smaller CMS beds, significantly driving down the price of a nitrogen PSA system by reducing the required size.

The present invention achieves this result by producing an improved CMS adsorbent for the nitrogen PSA application by increasing its capacity during production. The present invention sets forth a technique which not only increases the capacity of porous carbons, but provides them with faster gas uptake rates, allowing high temperatures to be used during carbon formation (which increases capacity even further).

The creation of activated carbon begins with a carbonaceous precursor, such as coconut shells, wood, fruit pits, nut shells, coal, or bone among other things. The first step of preparation is carbonization, or pyrolysis, where the carbon material is heated, preferably in an inert environment, to eliminate non-carbon species and to create a rudimentary pore structure, thereby creating a "char". In a preferred embodiment of the present invention, pyrolysis is performed in a two-step fashion, first at a lower temperature of approximately 300° C. to 600° C., then at a higher one of at least approximately 800° C., preferably no higher than 1,000° C. The intermediate carbon material is referred to as a "pre-char" carbon. After full pyrolysis, the "char" undergoes activation (or gasification), an oxidation process by which the volume and diameter of the pores is increased, the existing pore structure is further enhanced, and some new porosity is created. This is done by heating the char under carbon dioxide, air or steam. Finally, this activated carbon can be subjected to carbon deposition, or cracking, by treating it with a hydrocarbon to restrict the opening of the pores to the point that they can differentiate between nitrogen and oxygen, thereby producing a CMS. Isobutylene, trimethylcyclohexane, and toluene are common cracking agents.

The adsorption capacity of carbon adsorbents is very important for a PSA process. Higher capacity can be obtained in moderation by different starting materials. Some synthetic materials, such as phenolic resin-based sieves provide high capacity, but are very expensive. Other organic precursors (fruit pits, nut shells, etc.) yield activated carbons with satisfactory pore volumes, but while laboratory data indicates that some of these materials yield good capacity on a per gram basis, the less dense structure of these materials makes their capacity limited on a per volume basis per Table 1.

TABLE 1

|  | Gravimetric Nitrogen Capacity (mmol/g) | Volumetric Nitrogen Capacity (mmol/cc) |
|---|---|---|
| Coconut Shell | 0.795 | 0.503 |
| Peach Pit | 0.930 | 0.366 |
| Apricot Pit | 0.860 | 0.402 |
| Walnut Shell | 0.490 | N/A |

All were pyrolyzed at 575° C. for 4 hours then at 900° C. for 18 minutes under nitrogen.

High density organic precursors, such as coconut shells, can be engineered to have high capacities through higher pyrolysis temperatures, but the heat tends to restrict pore openings within the sieve, resulting in a "slow" carbon material which requires very long residence times to obtain an effective separation.

Activation can be used to increase the adsorption capacity of a carbon, but, since activation is not a pore selective process, the decrease in density, which is typical of this process, can result in a carbon material with a lower volumetric capacity, even though the gravimetric (weight basis) capacity is improved.

The present invention produces enhanced microporous carbonaceous adsorbents or carbon molecular sieves characterized by high gas capacity, fast gas uptake rates, and high density. In a preferred embodiment, the material is prepared using a two-step pyrolysis technique. In the first step, a carbonaceous material, such as wood, coal, fruit pits, nut shells, bone or coconut shells, is mildly pyrolyzed in an oxygen deficient (less than 21% $O_2$) or inert (less than 0.5% $O_2$) atmosphere at 300° to 600° C., preferably around 600° C., to produce a pre-char carbon. A pre-char carbon can be defined as an essentially totally carbonized precursor heated to a temperature in the range of approximately 300° to 600° C. in an oxygen deficient atmosphere in which the densification, graphitization and micropore volume development are still incomplete. This pre-char is then impregnated with a transition metal ion salt and further pyrolyzed at temperatures of at least 800° C., preferably no greater than 1000° C., again, preferably, in an oxygen deficient or inert atmosphere. The resulting chars demonstrate higher capacity and uptake rates than comparable chars prepared without the impregnation step. The superior adsorption characteristics of these hybrid carbon materials makes them excellent precursors to molecular sieve adsorbents for the separation of nitrogen from air. The following examples detail the process and show evidence of its utility.

EXAMPLE 1

Iron (III) Chloride Treatment

Approximately 500 g of coconut shells were heated in nitrogen at 575° C. for 4 hours, then separated into four batches. One batch was left untreated, one was impregnated with enough 0.5N aqueous iron (III) chloride solution to impart a 5% weight increase in the sample, and a third was impregnated with enough 1.0N $FeCl_3$ to yield a 10 wt % increase. The concentration of the solution was selected so that the chars would be impregnated via incipient wetness (i.e., no excess solution). The mixture was allowed to sit for 1–2 hours before being transferred to a 110° C. oven to drive off the excess solvent. Finally, the three batches were pyrolyzed further at 900° C. under nitrogen for 18 minutes. The adsorption properties were measured for the materials and are summarized below:

TABLE 2

| Description | G.C. (mmol/g) | V.C. (mmol/cc) | MTC (1/min) $N_2$ | MTC (1/min) $O_2$ |
|---|---|---|---|---|
| Untreated Char | 0.795 | 0.503 | 0.205 | 0.990 |
| 5 wt % $FeCl_3$ Treated Char | 0.895 | 0.540 | 0.813 | 1.680 |
| 10 wt % $FeCl_3$ Treated Char | 0.897 | 0.541 | 1.190 | 2.760 |

G.C. = Gravimetric Nitrogen Capacity
V.C. = Volumetric Nitrogen Capacity
MTC = Mass Transfer Coefficient This data shows that the incorporation of iron prior to high temperature pyrolysis produces an adsorbent with higher nitrogen capacity, as well as faster uptake rates compared to the untreated char. The pore structure of both materials were investigated using mercury porosimetry and helium pycnometry. The results show that iron impregnation results in a char with 14% greater porosity (0.41 vs. 0.36 cc/g) compared to a plain char. It was also found that, again compared to the untreated material, the iron impregnated char has a higher helium density (2.20 vs. 2.06 g/cc) which suggests the production of a carbon with less closed porosity, allowing greater capacity for gas adsorption.

EXAMPLE 2

Copper (II) Chloride Treatment

The fourth batch of pre-char mentioned in Example 1 was treated in precisely the same manner as the iron chloride impregnated samples with the exception that, for this experiment, enough 0.5N copper (II) chloride was used to impart 5 wt % of that compound on the pre-char. Final pyrolysis conditions were identical. The adsorption properties were again measured and compared to the untreated material.

TABLE 3

| Description | G.C. (mmol/g) | V.C. (mmol/cc) | MTC (1/min) $N_2$ | MTC (1/min) $O_2$ |
|---|---|---|---|---|
| Untreated Char | 0.795 | 0.503 | 0.205 | 0.990 |
| 5 wt % $CuCl_2$ Treated Char | 0.942 | 0.562 | 0.430 | N/A |

G.C. = Gravimetric Nitrogen Capacity
V.C. = Volumetric Nitrogen Capacity
MTC = Mass Transfer Coefficient It can be seen that this material has an even greater capacity than the iron impregnated material, although the improvement in mass transfer coefficient was not as great.

The adsorption properties were measured using an isotherm unit which determines the amount of nitrogen and oxygen adsorbed at various pressures. Reported capacity measurements are for nitrogen because oxygen tends to chemisorb on the sample, which could make the results artificially high. Gravimetric capacity is measured at 4 atmospheres pressure and 30° C. for a given weight of sample (<50 g). Bulk density is measured by filling a 10 ml graduated cylinder with the material and weighing. Volumetric capacity is a product of gravimetric capacity and bulk density. Nitrogen and oxygen mass transfer coefficients are estimated using a linear driving force model.

$$n/n_e = (1 - e^{-kt}) \text{ or } k = -\log(1-x)/t$$

| | |
|---|---|
| x = fractional uptake | n = moles sorbed |
| k is estimated using the slope between t = 0 and 30 seconds by convention | $n_e$ = moles sorbed at equilibrium |
| | k = mass transfer coefficient |

The impregnating solution can be any transition metal salt (most notably $FeCl_3$, $CuCl_2$ and $NiCl_2$) and the loading of that metal salt can vary from 0.5–15 wt %. Initial pyrolysis temperatures may vary from approximately 300°–600° C. while the secondary pyrolysis can be performed from approximately 800°–1000° C. for 0.3–1.0 hours. The initial pyrolysis procedure is done in an oxygen deficient or inert atmosphere. The subsequent pyrolysis is done in an oxygen deficient or inert atmosphere, or it can be done in an oxidative atmosphere to impart the activation of the carbon. Once activated and subjected to carbon deposition (cracking), the material may be ground to be utilized as a granular CMS, or pulverized, mixed with a binder, and extruded to form a pelleted CMS.

The capacity improvement of the present invention results in a smaller volume of CMS required to provide a given amount of nitrogen gas product. From the results obtained from experiments, impregnating a carbonaceous precursor with 10 wt % $FeCl_3$ can improve the capacity by about 12%. For a given nitrogen gas product demand, this means the CMS beds, by far the largest part of a PSA system, can be reduced in size. This, coupled with the fact that the capital cost of the CMS itself could be reduced by using less material, represents a potential reduction in cost for a $N_2$ PSA system.

During pyrolysis, two things occur: pore volume increases and the mass transfer coefficient decreases with the effects magnified with increasing pyrolysis time. The fact that the pyrolysis of a metal impregnated char results in a substantially lower decrease in the mass transfer coefficient compared to plain char indicates that a metal impregnated material may be pyrolyzed for longer periods of time and at higher temperatures without drastically reducing the mass transfer coefficient of the char, potentially resulting in a porous carbon with increased capacity and enhanced microporosity above and beyond the improvement brought about by the treatment alone.

The use of metallic species in the production of carbons is not new. Various metal salts have been used to chemically activate carbon precursors. These typically have been chemical activation steps as opposed to thermal or physical activation steps of the present invention. Following the metal treatment, the prior art typically washes the activated carbon with water to remove the metal, which is then recycled. There are other chemical activating agents used in a similar fashion for carbon manufacture, such as potassium and sodium carbonate. In the present invention, the metallic species remains on the material, instead of being removed and recycled.

One of the differences between these carbon techniques and the present invention is the timing of the impregnation and the recovery of the metallic species. In the known carbons, metallic impregnation is typically performed on the raw carbon precursors, while the present invention is directed to the treatment of a pre-char carbon that is produced in an oxygen-deficient atmosphere at temperatures in the range of approximately 300° to 600° C.

Further, in the known treatment of carbons, the metal is used to chemically activate the raw material by participating in dehydration reactions, resulting in the chemical charring of the precursor. Because dehydration reactions are essentially complete at the pre-char stage due to heat treatment, the chemistry involved with the present invention is quite different. Finally, the end product obtained by the present invention is different than that resulting from the known metal depositions in carbons. The present invention focuses on increasing the microporosity of a carbon, preferably a carbon molecular sieve, to improve its effectiveness in gas-phase adsorptive applications.

The present invention has been set forth with regard to several preferred embodiments. However, the full scope of the present invention should be ascertained from the claims which follow.

We claim:

1. A process for preparing an activated carbon impregnated with a transition metal salt with enhanced microporosity, comprising:

(a) impregnating a transition metal salt on a thermally generated pre-char carbon so as to impart approximately 0.5 to 15 weight percent of said transition metal salt on to said pre-char carbon based upon said pre-char carbon after impregnating said transition metal salt; and (b) pyrolyzing said carbon at a temperature in the range of at least approximately 800° C. to produce a transition metal salt impregnated activated carbon.

2. The process of claim 1 wherein said transition metal is selected from the group consisting of iron, nickel, manganese and copper.

3. The process of claim 1 wherein said impregnation is performed with a solution of said transition metal salt in an amount no greater than sufficient to wet said carbon.

4. The process of claim 1 wherein said transition metal salt is selected from the group consisting of iron chloride, nickel chloride, copper chloride, manganese chloride and iron nitrate.

5. The process of claim 1 wherein said pyrolysis is performed in an oxidative atmosphere selected from the group consisting of carbon dioxide, air, steam and mixtures thereof.

6. The process of claim 1 wherein said pyrolysis is performed in an oxygen deficient atmosphere.

7. The process of claim 6 wherein said oxygen deficient atmosphere has no more than 0.5 percent oxygen.

8. The process of claim 1 wherein said pre-char carbon is formed by the pyrolysis of a carbon in an oxygen deficient atmosphere at a temperature in the range of approximately 300° to 600° C.

9. The process of claim 8 wherein said carbon is selected from the group consisting of wood, coal, fruit pits, nut shells, bone and coconut shell.

10. The process of claim 1 wherein after said pyrolysis said carbon is activated by heating in the presence of an oxidation agent selected from the group consisting of carbon dioxide, air, steam and mixtures thereof.

11. The process of claim 1 wherein said carbon is further subjected to cracking of hydrocarbons on pores of said activated carbon to restrict the size of said pores in said carbon to produce a transition metal salt impregnated carbon molecular sieve adsorbent having enhanced microporosity.

12. A process for preparing a transition metal salt impregnated carbon molecular sieve adsorbent having enhanced microporosity, comprising:

(a) pyrolyzing a carbon in an inert atmosphere at a temperature in the range of approximately 300° to 600° C. to partially pyrolyze the carbon to a pre-char carbon;

(b) impregnating a solution of a transition metal salt on said partially pyrolyzed pre-char carbon so as to just wet said pre-char carbon to impart an approximately 0.5 to 15 weight percent increase in said pre-char carbon;

(c) drying said impregnated pre-char carbon at a temperature no greater than 200° C.;

(d) further pyrolyzing said impregnated pre-char carbon in an inert atmosphere at a temperature in the range of approximately 800° to 1000° C. to produce a char;

(e) activating said char by heating the char in the presence of an oxidation agent selected from the group consisting of carbon dioxide, air, steam and mixtures thereof; and (f) cracking hydrocarbons on pores of said activated char to restrict the size of said pores in said char to produce a transition metal salt impregnated carbon molecular sieve adsorbent having enhanced microporosity.

* * * * *